US006926123B2

(12) United States Patent
Goebel et al.

(10) Patent No.: US 6,926,123 B2
(45) Date of Patent: Aug. 9, 2005

(54) METHOD OF EFFECTING THE NON-MACHINING FORMING OF A BRAKE CALIPER AS WELL AS A BRAKE CALIPER FORMED WITHOUT MACHINING

(75) Inventors: René Goebel, Schwerdorff (FR); Jean Jacques Maiwurm, Creutzwald (FR); Karl Ehl, Höhr-Grenzhausen (DE); Eric Huguet, Croissy Beaubourg (FR); Berthold Klump, Singhofen (DE); Joachim Kremer, Emmelshausen (DE); Rainer Lewenz, Kamp-Bornhofen (DE); René Straub, Holling (FR); Magda Wojcik, Brachtendorf (DE); Christoph Walden, Plaidt (DE); Michael Walden, Andernach (DE)

(73) Assignees: Lucas Varity GmbH (DE); TRW Systemes de Freinage S.A.S. (FR)

( * ) Notice: Subject to any disclaimer, the term of this patent is extended or adjusted under 35 U.S.C. 154(b) by 30 days.

(21) Appl. No.: 10/640,099

(22) Filed: Aug. 13, 2003

(65) Prior Publication Data

US 2004/0060781 A1 Apr. 1, 2004

Related U.S. Application Data

(63) Continuation of application No. PCT/EP02/01341, filed on Feb. 8, 2002.

(30) Foreign Application Priority Data

Feb. 13, 2001 (DE) .......................................... 101 06 591

(51) Int. Cl.$^7$ ............................................. F16D 55/226
(52) U.S. Cl. .................... 188/71.1; 164/137; 188/73.31
(58) Field of Search ................................. 164/113, 112, 164/120–122, 28, 132, 154, 369, 342, 350, 137; 29/527.6; 188/73.31, 71.1, 370; 269/303, 234; 82/1.2

(56) References Cited

U.S. PATENT DOCUMENTS

| 3,707,207 | A | | 12/1972 | Kondo | |
|---|---|---|---|---|---|
| 4,049,086 | A | | 9/1977 | Rath | |
| 5,518,062 | A | * | 5/1996 | Kobayashi et al. | .......... 164/137 |
| 6,427,755 | B1 | * | 8/2002 | Buckley | ..................... 164/132 |
| 2003/0205351 | A1 | * | 11/2003 | Buckley | ..................... 164/132 |

FOREIGN PATENT DOCUMENTS

| DE | 22 11 453 | 12/1972 |
|---|---|---|
| DE | 20 43 652 | 7/1975 |
| DE | 26 38 508 | 3/1977 |

(Continued)

OTHER PUBLICATIONS

Document Bibliography and Abstract for DE 20 43 652 http://12.espacenet.com/espacenet/viewer?PN=DE2043652&CY=ep&LG=en&DB=EPD printed Aug. 1, 2003.

(Continued)

Primary Examiner—Douglas C. Butler
(74) Attorney, Agent, or Firm—MacMillan, Sobanski & Todd, LLC

(57) ABSTRACT

A brake caliper formed without machining for a spot-type disc brake, in which the brake caliper after subsequent machining forms a floating caliper, has a braking force generator (12) and an opposite-lying abutment (22). For the non-machining forming of the brake caliper (10) two mould parts (34, 36) each partially receiving the brake caliper (10) are used, in which support surfaces (Q1, Q2, Q3, Q4, Q5) and action surfaces (S1/2, S3, S4, S5) are formed on the brake caliper (10) in such a way that the brake caliper (10) for the subsequent machining is supportable by its support surfaces (Q1, Q2, Q3, Q4, Q5) in a defined manner and clampable by means of clamping forces acting upon its action surfaces (S1/2, S3, S4, S5). To keep the extent of the subsequent machining to a minimum, during the non-machining forming the abutment (22) and the support surfaces (Q1, Q2, Q3, Q4, Q5) of the brake caliper (10) are formed in one and the same mould part (34).

8 Claims, 4 Drawing Sheets

FOREIGN PATENT DOCUMENTS

| | | |
|---|---|---|
| DE | 195 42 425 | 12/1996 |
| DE | 197 39 122 | 3/1999 |
| DE | 199 01 690 | 7/2000 |
| DE | 010106591 C1 | 8/2002 |
| EP | 1 096 167 * | 5/2001 |
| WO | WO 02/06499 A1 * | 8/2002 |

OTHER PUBLICATIONS

Document Bibliography and Abstract for DE 26 38 508 http://12.espacenet.com/espacenet/viewer?PN=DE2638508&CY=ep&LG=en&DB=EPD printed Aug. 1, 2003.

* cited by examiner

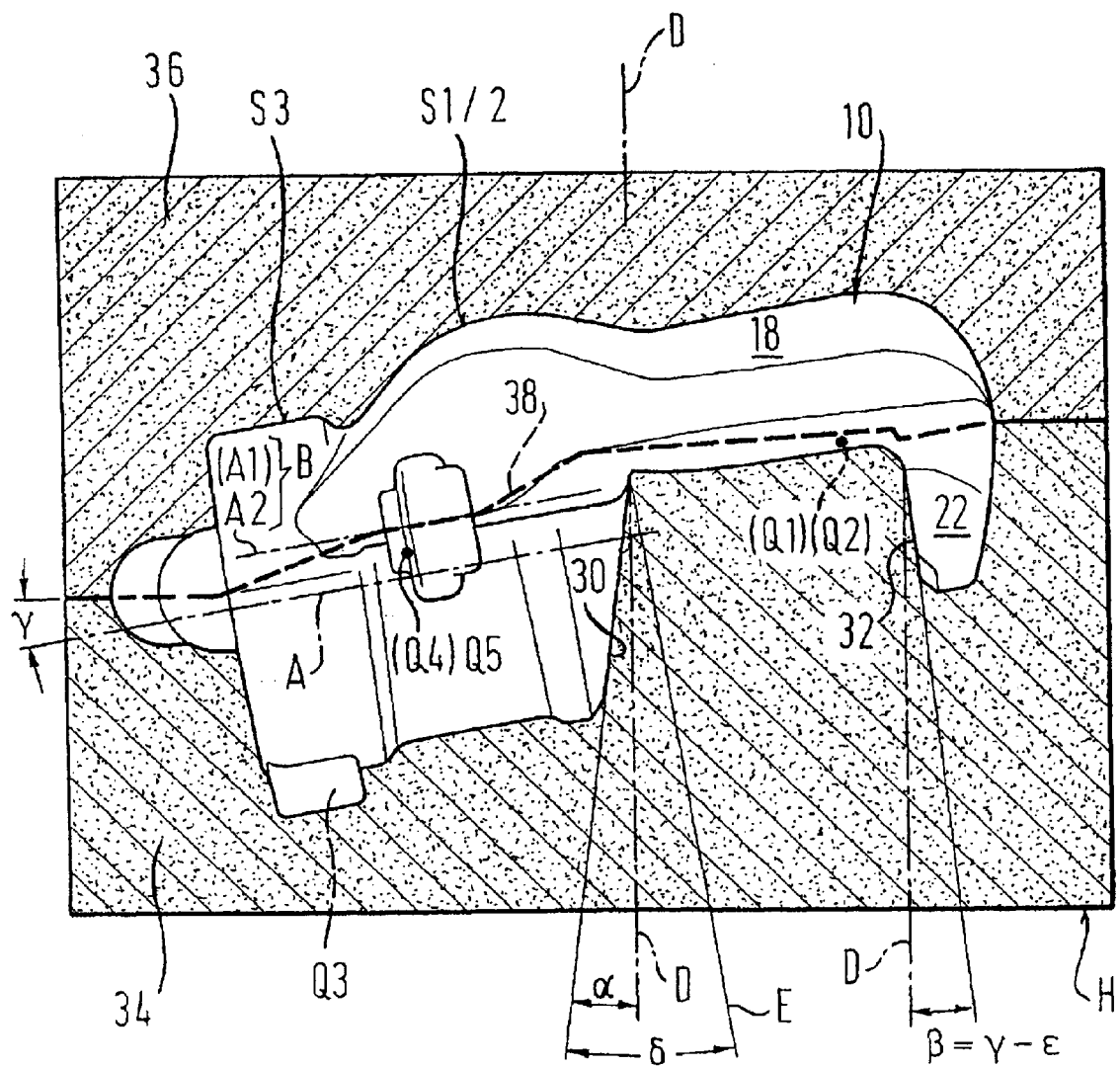

METHOD OF EFFECTING THE NON-MACHINING FORMING OF A BRAKE CALIPER AS WELL AS A BRAKE CALIPER FORMED WITHOUT MACHINING

CROSS REFERENCE TO RELATED APPLICATIONS

This application is a continuation of International Application No. PCT/EP02/01341 filed Feb. 8, 2002, which claimed priority to German Patent Application No. 101 06 591.4 filed Feb. 13, 2001, the disclosures of which are incorporated herein by reference.

BACKGROUND OF THE INVENTION

The invention relates to a method of effecting the non-machining forming of a brake caliper for a spot-type disc brake, in which the brake caliper after a subsequent machining forms a floating caliper, comprising a braking force generator and an opposite-lying abutment, wherein for the non-machining forming at least two mould parts each partially receiving the brake caliper are used, in which as preparation for the subsequent machining support surfaces as well as action surfaces are formed on the brake caliper, wherein the brake caliper for the subsequent machining is supportable by its support surfaces in a defined manner and clampable by means of clamping forces acting upon its action surfaces.

The invention further relates to a brake caliper formed without machining for a spot-type disc brake, in which the brake caliper after subsequent machining forms a floating caliper, comprising a braking force generator in the form of a cylinder, which defines a cylinder axis and has a cylinder bottom, an abutment lying opposite the braking force generator, at least one pair of guide bodies, which are formed one on either side of the cylinder and on each of which a guide having a guide axis parallel to the cylinder axis may be formed, a bridge, which connects the braking force generator to the abutment and has an inner side facing the cylinder axis, and support surfaces and action surfaces, which are formed on the brake caliper and enable a defined supporting and clamping of the brake caliper for subsequent machining.

From DE 195 42 425 C1 it is known for a rough casting or forging of a brake caliper intended as a floating caliper of a spot-type disc brake to be provided during casting or forging with three defined support surfaces, which for subsequent machining are then placed each on a supporting surface of a clamping device, whereupon the brake caliper is loaded with clamping forces that prevent its displacement on the supporting surfaces. The three support surfaces are all formed in a back region of the brake caliper that, in relation to the arrangement of the brake caliper as a component of a disc brake, lies radially at the outside, i.e. remote from the brake disc. The clamping forces needed for clamping the brake caliper on the supporting surfaces are applied so as to act, in relation to the arrangement of the brake caliper in the finished disc brake, radially from the inside towards the outside. This facilitates a defined and substantially consistently accurate clamping of cast or forged brake calipers, wherein their surfaces to be machined are easily accessible.

SUMMARY OF THE INVENTION

The underlying object of the invention is to develop a method and a brake caliper of the initially described type in such a way that, given the existing requirements for accuracy in the finished brake caliper, subsequent machining of the brake caliper formed without machining is necessary only to a lesser extent than previously.

As regards the method, the object is achieved according to the invention in that during non-machining forming the abutment and the support surfaces of the brake caliper are formed in one and the same mould part.

The method according to the invention is particularly suitable for effecting the non-machining forming of a brake caliper comprising a braking force generator in the form of a cylinder, which defines a cylinder axis and has a cylinder bottom, at least one pair of guide bodies, which are formed one on either side of the cylinder and on each of which a guide having a guide axis parallel to the cylinder axis may be formed, and a bridge, which connects the braking force generator to the abutment and has an inner side facing the cylinder axis.

During the non-machining forming of such a brake caliper it is expedient when a first and a second support surface are formed on the inner side of the bridge at identical distances from the cylinder axis, each adjacent to one of the two guide axes, close to the abutment, and a third support surface is formed in an edge region of the cylinder bottom remote from the bridge in such a way as to be centered in relation to a center plane, which contains the cylinder axis and extends normally to a guide plane, in which the two guide axes lie.

In said case, it is further advantageous when for the non-machining forming of the brake caliper two mould parts are used, which may be put together and moved apart along a mould axis and in the put-together state lie against one another in a parting plane, of which at least one region adjoining the brake caliper together with the mould axis forms an angle of less than 90°, and the guide plane and the cylinder axis are inclined at an acute angle of inclination relative to a plane normal to the mould axis.

It is moreover expedient when during non-machining forming of the brake caliper an end face directed towards the abutment and diverging from the latter with increasing distance from the bridge is formed on the braking force generator and together with a plane normal to the cylinder axis forms an angle, which is greater than the angle of inclination.

During non-machining forming of the brake caliper an end face directed towards the braking force generator is preferably formed on the abutment and together with the mould axis forms an angle of skew which, while being sufficient for damage-free removal from the mould, is however smaller than the angle of inclination.

Finally, during the non-machining forming there are expediently formed on the brake caliper a fourth and a fifth support surface normal to the cylinder axis, and the first, second and third support surfaces in such a way that they do not oppose a displacement of the brake caliper in a direction parallel to the cylinder axis during clamping for the subsequent machining.

Insofar as the described object relates to a brake caliper as such, proceeding from a brake caliper of the initially described type said object is achieved according to the invention in that a first and a second support surface are formed on the inner side of the bridge at identical distances from the cylinder axis, each adjacent to one of the two guide axes, close to the abutment, and a third support surface in an edge region of the cylinder bottom remote from the bridge is centered in relation to a center plane, which contains the cylinder axis and extends normally to a guide plane, in which the two guide axes lie.

The brake caliper formed without machining according to the invention is preferably developed in that an end face directed towards the abutment and diverging from the latter with increasing distance from the bridge is formed without machining on the braking force generator and together with a plane normal to the cylinder axis forms an angle, which is greater than the angle of inclination.

Finally, it is expedient when the brake caliper has one fourth and one fifth support surface normal to the cylinder axis, and the first, second and third support surface extend parallel to the cylinder axis.

BRIEF DESCRIPTION OF THE DRAWINGS

The presumed prior art as well as two embodiments of the invention are described in detail below with reference to diagrammatic drawings:

FIG. 3 is a vertical section of a casting mould used according to the invention to cast a brake caliper, wherein said brake caliper is shown likewise in side view;

DETAILED DESCRIPTION OF THE INVENTION

Figure 1:
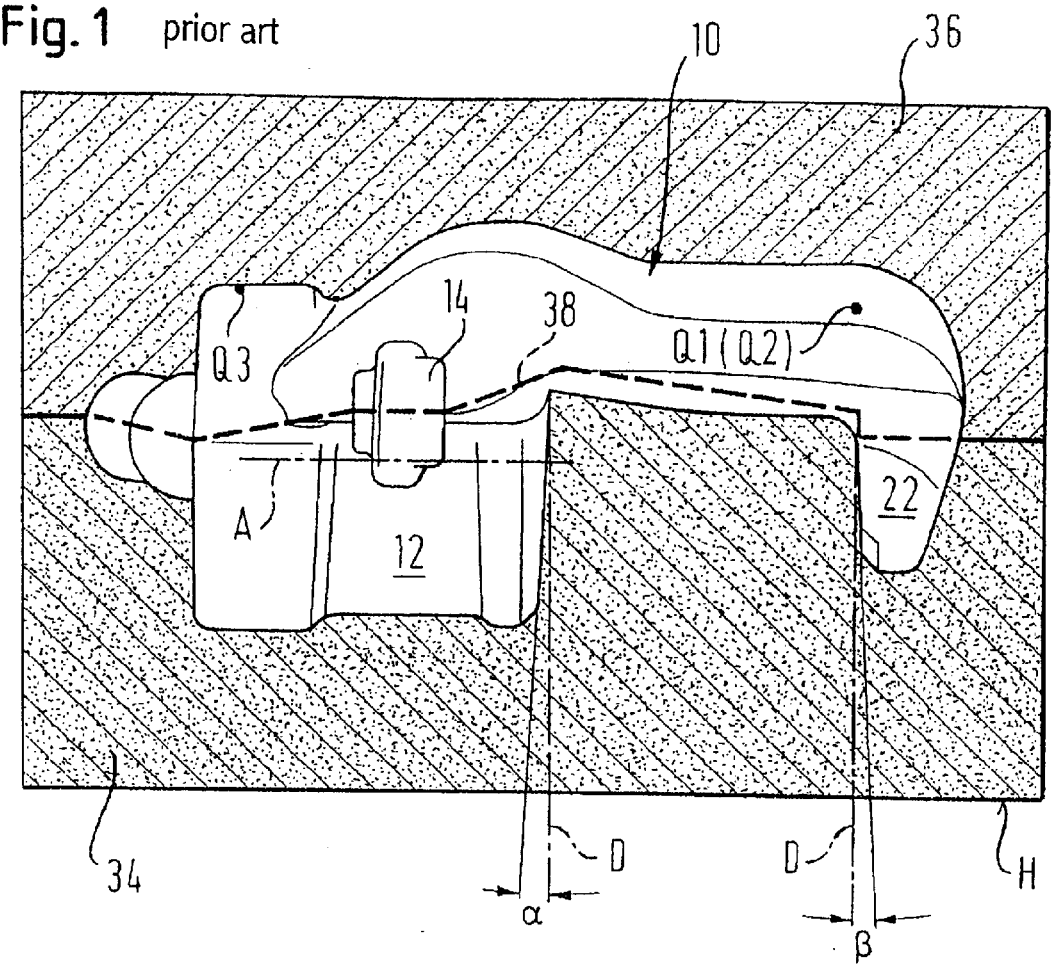
FIG. 1 is a vertical section of a two-part mould used according to the prior art to cast a brake caliper, wherein the brake caliper is shown in side view.
Figure 2:
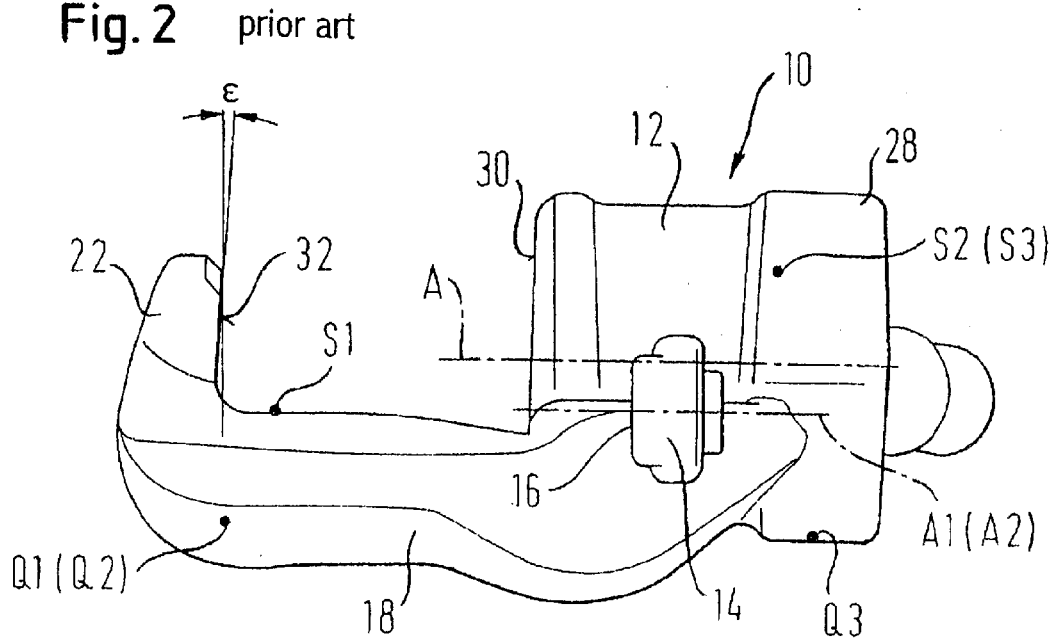
FIG. 2 is a view of the brake caliper cast in a known manner, removed from its casting mould and turned through 180° for subsequent machining.

FIGS. 1 and 2 show a brake caliper 10, which has proved its worth millions of times over as a floating caliper for disc brakes. It is an integral casting of nodular cast iron, but might alternatively be a die-cast aluminium part or a forging. The brake caliper 10 has a braking force generator 12 in the form of a hydraulic cylinder, which has the cylinder axis A and from which two arms lying almost diametrically opposite one another and referred to hereinafter as guide bodies 14 project substantially at right angles to the cylinder axis A. Associated with the two guide bodies 14 on the finished brake caliper 10 there is in each case a guide 16, of which the axis referred to hereinafter as guide axis A1 and A2, respectively, extends parallel to the cylinder axis A, so that during operation of the brake it allows a displacement of the brake caliper 10 in the direction of the cylinder axis A.

In order to manufacture the guides 16, during finish-machining of the brake caliper 10 the two arms 14 are each provided with a corresponding bore. To each of said bores a cylindrical guide pin is fastened in such a way that its axis is identical to the associated guide axis A1 and A2, respectively. The guide axes A1 and A2 are defined by guide bores in a brake anchor plate, in each of which guide bores one of the said guide pins is guided in an axially displaceable manner. As such a guidance of a floating caliper of a disc brake is known e.g. from DE 20 43 652 C3 and DE 26 38 508 B2, it need not be described in connection with the present invention. Also possible is a kinematic reversal, in which guide bores are formed on the floating caliper and are axially displaceable in each case on a guide pin fastened to the associated brake anchor plate; this is known from DE 22 11 453 C3.

Attached to the braking force generator 12 in the vicinity of the two guide bodies 14 is a bridge 18, which extends substantially parallel to the cylinder axis A between the two guide axes A1 and A2, has an oblong bridge opening 20 (see FIGS. 4 and 5) and carries an abutment 22. The abutment 22 extends substantially at right angles to the cylinder axis A and is divided by a recess 24 into two finger-like halves. For subsequent machining drilling, turning and milling tools may be moved through the recess 24 to the braking force generator 12 in order to machine there a cylinder wall 26, a cylinder bottom 28 and an end face 30 or parts thereof, wherein inter alia annular grooves for sealing rings and gaskets may be incorporated in a known manner.

Lying opposite the end face 30 of the braking force generator 12 is an end face 32, which is formed on the abutment 22 and which in the case of the known brake caliper 10 illustrated in FIGS. 1 and 2 likewise requires machining after casting or forging. Said requirement arises from the fact that according to FIG. 1 the cylinder axis A and the two guide axes A1 and A2, and hence also the common plane of the two guide axes hereinafter referred to as guide plane B, are disposed normally, i.e. at right angles, to the direction referred to hereinafter as mould axis D, in which the mould parts 34 and 36 shown in an extremely simplified manner in FIG. 1 and forming the casting mould are moved towards and apart from one another in order to close and open the casting mould.

In the closed state of the casting mould, the two mould parts 34 and 35 are in contact in a parting plane 38, which according to the prior art illustrated in FIG. 1 is disposed substantially parallel to a horizontal surface H, on which the bottom mould part 34 rests. So that a model of the brake caliper 10 used for sand casting may be removed without damage, and so that the same also applies to the brake caliper itself, when the mould parts 34 and 36 are part of a casting die, it is necessary for the two end faces 30 and 32 to be disposed at an angle of skew α and β respectively in relation to the mould axis D, wherein said two angles may be equal in size and are always disposed in such a way that the two end faces 30 and 32 diverge in a direction away from the bridge 18, i.e. the distance between them becomes greater.

Regardless of the angle of skew α, the end face 30 of the braking force generator 12 requires subsequent machining only to the extent that this is necessary to attach a gasket or the like. The end face 32 of the abutment 22, on the other hand, in the known brake caliper usually requires subsequent machining because it is desirable for the abutment 22 to act substantially only with an, in FIG. 1 lower, in FIG. 2 upper, edge region of its end face 32 upon a brake shoe supported on the abutment so that said brake shoe is subject to uniform wear in operation. It has therefore previously been considered necessary to effect subsequent machining of the end face 32 of the abutment 22 at a—compared to the angle of skew β—negative angle ε, as illustrated in FIG. 2.

Figure 5:
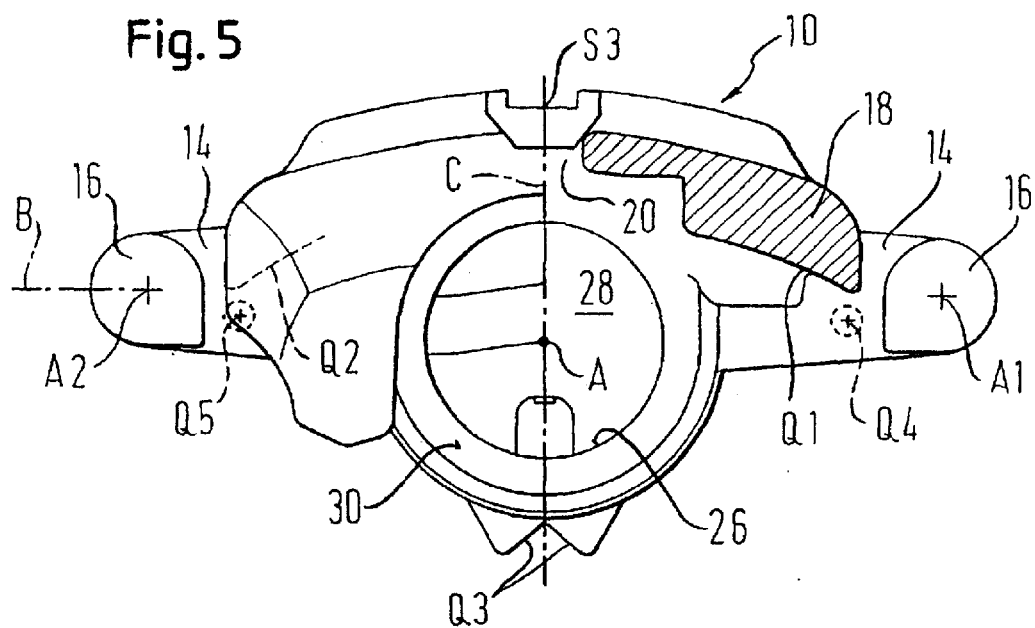
FIG. 5 is the view, shown partially as a cross section, in the direction of the arrows V in FIG. 4.
Figure 4:
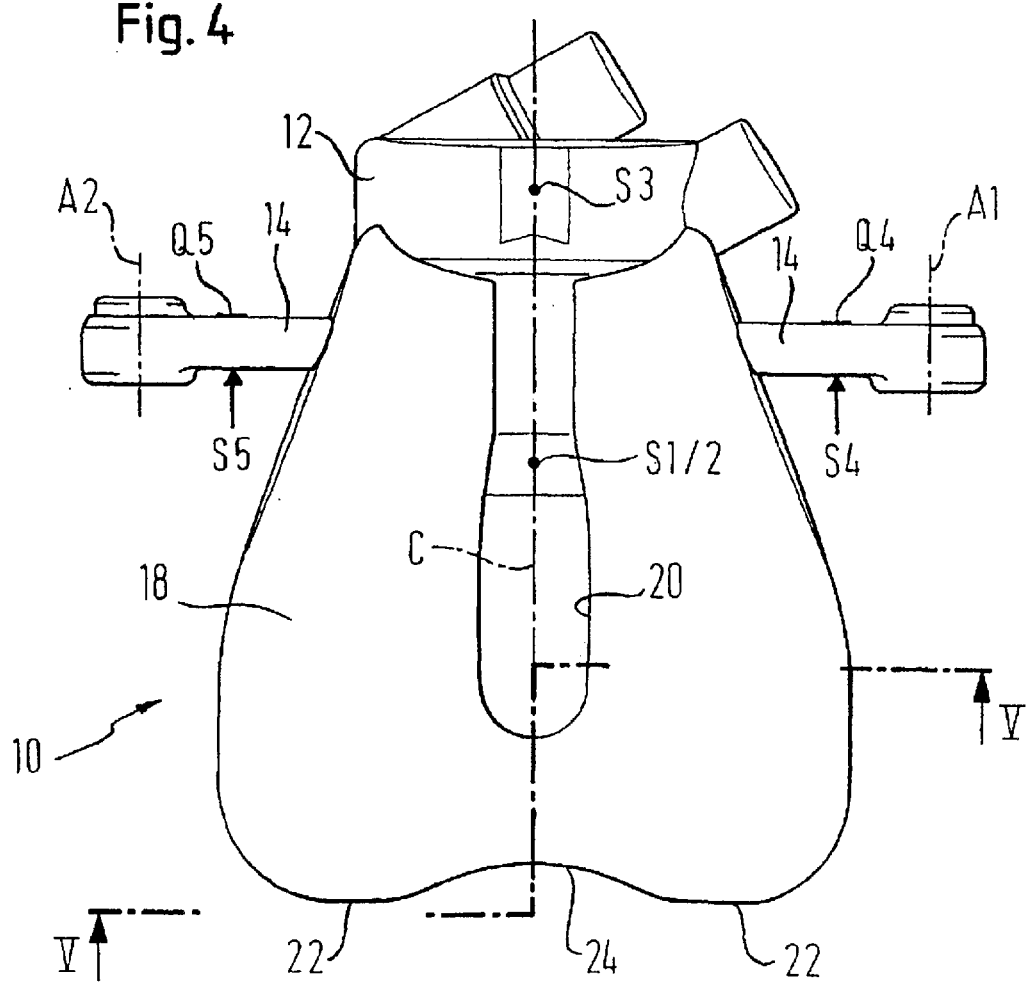
FIG. 4 is the plan view of the brake caliper shown in FIG. 3, only removed from its casting mould and in a suitable position for subsequent machining.
Figure 7:
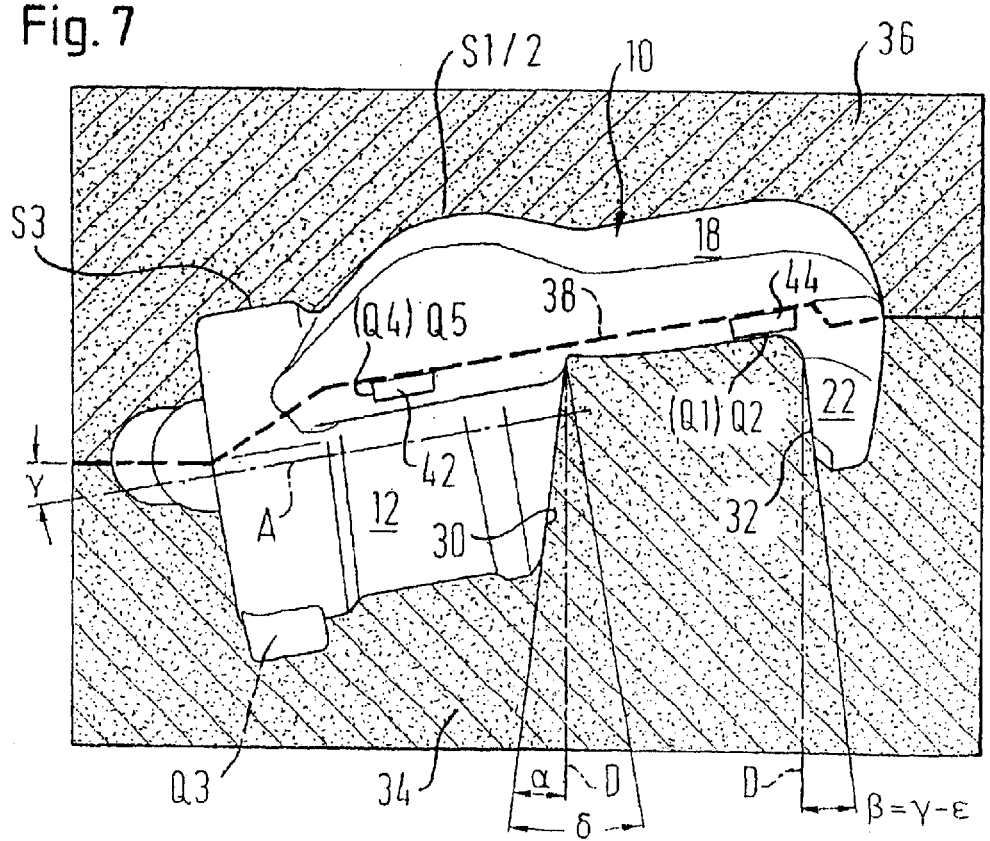
FIG. 7 is a vertical section of a casting mould used according to the invention to cast a brake caliper, wherein said brake caliper corresponds in terms of its configuration to the brake caliper shown in FIG. 6.

The need for such subsequent machining is avoided by the measures according to the invention, which are illustrated in FIGS. 3 to 5 and in FIG. 7.

Figure 6:
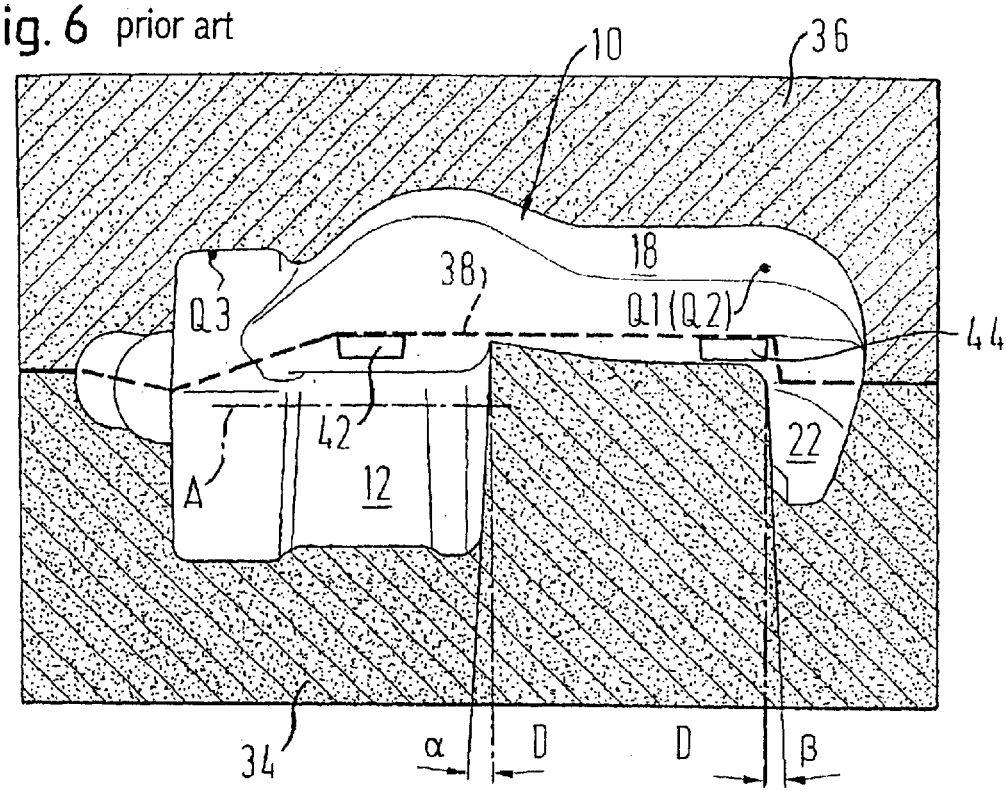
FIG. 6 is a section corresponding to FIG. 1 of a mould used according to the prior art to cast a partially differently configured brake caliper, wherein said brake caliper is shown in side view.

In order to clarify the difference between the procedure according to the invention and the presumed prior art, first of all a shortcoming is described, which has been identified as a consequence of the known procedure illustrated in FIG. 1 and in FIG. 6. In said case, support surfaces Q1, Q2 and Q3 for the subsequent defined placing of the brake caliper 10 onto a clamping device for subsequent machining are all formed in the upper mould part 36, whereas all of the surfaces that have to be associated with one another in a dimensionally relatively accurate manner in the finished brake caliper are produced during casting or forging of the brake caliper in the lower mould part 34. The upper mould part 36 is however possibly not positioned accurately enough relative to the lower mould part 34.

A change from the above is made in accordance with FIGS. 3 to 5 and FIG. 7. The essential surfaces that are to be subsequently machined are produced according to FIG. 3, just as in the known procedure illustrated in FIG. 1 and in FIG. 6, in the lower mould part 34. Parts to be subsequently machined include the cylinder wall 26, the cylinder bottom 28 and the end face 30 of the braking force generator 12 as well as—according to previous thinking—the end face 32 of the abutment 22. According to FIGS. 3 to 5 and FIG. 7, however, the support surfaces Q1, Q2 and Q3, by which the brake caliper 12 for its subsequent machining has to be supported in a defined manner on a clamping device, are now all produced likewise in the lower mould part 34, i.e.—in more general terms—in the same mould part as the abutment 22 and its end face 32 are produced during the non-machining forming of the brake caliper 10. In the other, according to FIG. 3 and FIG. 7 upper mould part 36, on the other hand, during the non-machining forming surfaces S1 and S3 are formed, upon which vertical clamping forces act during clamping of the cast or forged brake caliper 10, wherein it is not critical for said clamping surfaces to be associated in a dimensionally extremely accurate manner with the surfaces of the brake caliper 10 that are to be subsequently machined.

According to FIGS. 3 to 5 and FIG. 7 the support surfaces Q1 and Q2 are formed on the—in relation to the assembled, ready-to-operate brake caliper 10—radially inner side of the bridge 18, each in the vicinity of one of the two guide axes A1 and/or A2. Said two support surfaces Q1 and Q2 each lie in a plane parallel to the guide axes A1 and A2—and hence also to the cylinder axis A, so that they do not impede an adjustment of the brake caliper 10 in the direction of said axes. The third support surface Q3 is formed in the manner of a V-guide by two surfaces, which are disposed at an angle to one another and are both disposed likewise parallel to the axes A, A1 and A2, so that the support surface Q3 also enables displacement of the brake caliper 10 along said axes but, at the same time, prevents displacement in a direction at right angles to said axes.

For defined axial positioning of the brake caliper 10 in a clamping device provided for subsequent machining, in the embodiment illustrated in FIGS. 3 to 5 a fourth support surface Q4 and a fifth support surface Q5 are formed on the two guide bodies 14 of the brake caliper; said two support surfaces extend in a common plane normal to the axes A, A1 and A2. On the side of the relevant guide body 14 remote from said support surfaces Q4 and Q5 an action surface S4 and/or S5 is formed for a clamping force loading the brake caliper 10 in the direction of the axes A1 and A2, wherein once again a dimensionally accurate association of said action surfaces S4 and S5 is not critical. What is important is that the action surfaces S4 and S5, like the support surfaces Q4 and Q5, extend normally relative the axes A, A1 and A2 and hence do not prevent the brake caliper 10 from positioning itself, under the influence of clamping forces acting upon the action surfaces S1/2 and S3, with its support surfaces Q1, Q2 and Q3 on pre-determined points of the clamping device provided for the machining.

According to FIG. 3 and FIG. 7 the brake caliper 10 lies inclined at an angle of inclination γ to the horizontal H in the casting mould 34, 36. The end face 30 of the braking force generator 12 is inclined by the angle of skew α relative to the vertical mould axis D, and by the angle δ relative to the cylinder axis A; in said case, δ=α+γ. The end face 32 of the abutment 22 is inclined away from the end face 30 by the angle of skew β relative to the mould axis D; in said case, β=γ-ε. The angle ε is of the same importance and size as in the known brake caliper 10 illustrated in FIGS. 1 and 2.

The modified brake caliper 10 illustrated in FIG. 7 has a first pair of guide bodies 42, which are disposed one on either side of the braking force generator 12, as well as a second pair of guide bodies 44, which are disposed one on either side of the bridge 18, close to the abutment 22. Said guide bodies 42 and 44 are relatively small lateral projections of a rectangular profile, which are intended in a finished disc brake to be guided in grooves of the associated brake anchor plate so as to be displaceable parallel to the cylinder axis A.

In accordance with the provisions of the patent statutes, the principle mode of operation of this invention have been explained and illustrated in its preferred embodiment. However, it must be understood that this invention may be practiced otherwise than as specifically explained and illustrated without departing from its spirit or scope.

What is claimed is:

1. A method of effecting the non-machining forming of a brake caliper blank for a spot-type disc brake, in which the brake caliper blank after subsequent machining forms a floating caliper, comprising:
   a braking force generator in the form of a cylinder, which defines a cylinder axis and has a cylinder bottom,
   an abutment lying opposite the braking force generator,
   at least one pair of guide bodies, which are formed one on either side of the cylinder, and on each of which a guide having a guide axis parallel to the cylinder axis may be formed, and
   a bridge, which connects the braking force generator to the abutment and has an inner side facing the cylinder axis,
   wherein for the non-machining forming at least two mould parts each partially moulding the brake caliper blank are used, in which as preparation for subsequent machining support surfaces and action surfaces are formed on the brake caliper blank,
   wherein the brake caliper blank for the subsequent machining is supportable by its support surfaces in a defined manner and clampable by means of clamping forces acting upon its action surfaces, wherein during the non-machining forming of the brake caliper blank the abutment and the support surfaces of the brake caliper blank are formed in one and the same mould part, a first support surface and a second support surface are formed on the inner side of the bridge at identical distances from the cylinder axis, each adjacent to one of the two guide axes, close to the abutment, and a third support surface is formed in an edge region of the cylinder bottom remote from the bridge in such a way as to be centered in relation to a center plane, which contains the cylinder axis and extends normally to a guide plane, in which the two guide axes lie.

2. The method according to claim 1, wherein for the non-machining forming of the brake caliper blank two mould parts are used, which may be put together and moved apart along a mould axis and in the put together state lie against one another in a parting plane, of which at least one region adjoining the brake caliper blank together with the mould axis forms an angle of less than 90°, and the guide plane and the cylinder axis are inclined at an acute angle of inclination relative to a plane normal to the mould axis.

3. The method according to claim 2, wherein during the non-machining forming of the brake caliper blank an end face directed towards the abutment and diverging from the latter with increasing distance from the bridge is formed on the braking force generator and together with a plane normal to the cylinder axis forms an angle which is greater than the angle of inclination.

4. The method according to claim 2, wherein during the non-machining forming of the brake caliper blank an end face directed towards the braking force generator is formed on the abutment and together with the mould axis forms an angle of skew which, while being sufficient for damage-free removal from the mould, is smaller than the angle of inclination.

5. The method according to claim 1, wherein during the non-machining forming on the brake caliper blank a fourth support surface and a fifth support surface each normal to the cylinder axis are formed, and the first, second and third support surfaces are formed in such a way that they do not oppose a displacement of the brake caliper blank in a direction parallel to the cylinder axis during clamping for the subsequent machining.

6. A brake caliper blank formed without machining for a spot-type disc brake, in which the brake caliper blank after subsequent machining forms a floating caliper, comprising:

a braking force generator in the form of a cylinder, which defines a cylinder axis and has a cylinder bottom, an abutment lying opposite the braking force generator, at least one pair of guide bodies, which are formed one on either side of the cylinder, and on each of which a guide having a guide axis parallel to the cylinder axis may be formed, a bridge, which connects the braking force generator to the abutment and has an inner side facing the cylinder axis, and support surfaces and action surfaces, which are simultaneously formed on the brake caliper blank and enable a defined supporting and clamping of the brake caliper blank for the subsequent machining, wherein a first support surface and a second support surface are formed on the inner side of the bridge at identical distances from the cylinder axis, each adjacent to one of the two guide axes, close to the abutment, and a third support surface in an edge region of the cylinder bottom remote from the bridge is centered in relation to a center plane, which contains the cylinder axis and extends normally to a guide plane, in which the two guide axes lie.

7. The brake caliper blank according to claim 6, wherein an end face directed towards the abutment and diverging from the latter with increasing distance from the bridge is formed without machining on the braking force generator and together with a plane normal to the cylinder axis forms an angle, which is greater than an angle of inclination.

8. The brake caliper blank according to claim 6, wherein it has a fourth support surface and a fifth support surface each normal to the cylinder axis, and the first, second and third support surfaces extend parallel to the cylinder axis.

\* \* \* \* \*